April 23, 1940.   W. N. WOODRUFF ET AL   2,198,422
COIN CONTROLLED TIMING DEVICE
Original Filed March 16, 1936   4 Sheets-Sheet 1
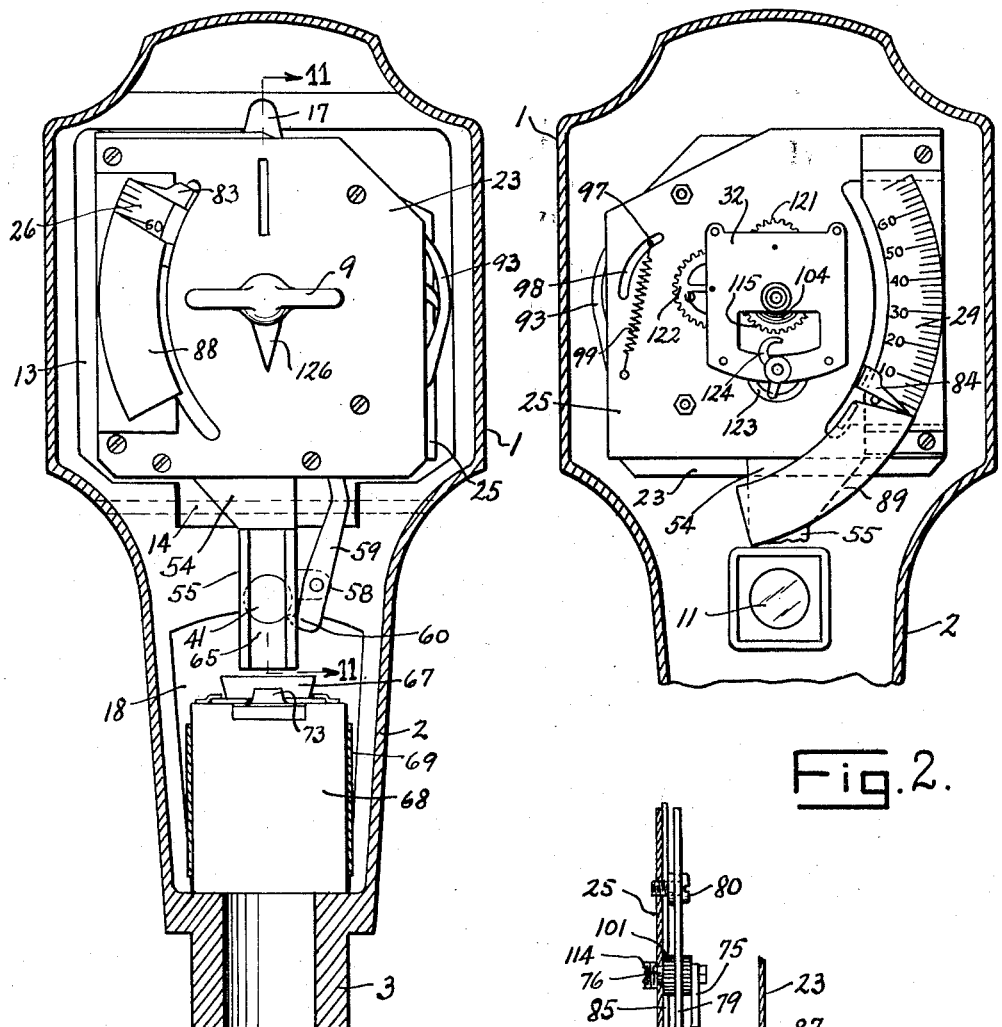
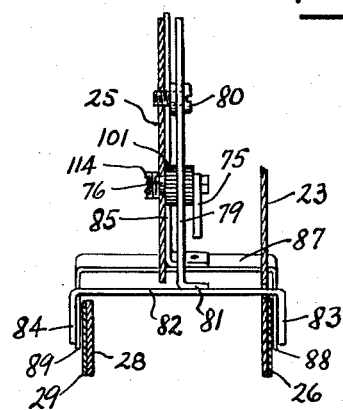
Fig.1.  Fig.2.  Fig.3.
Inventors
Noel M. Seeburg
William N. Woodruff.
By
Attorneys

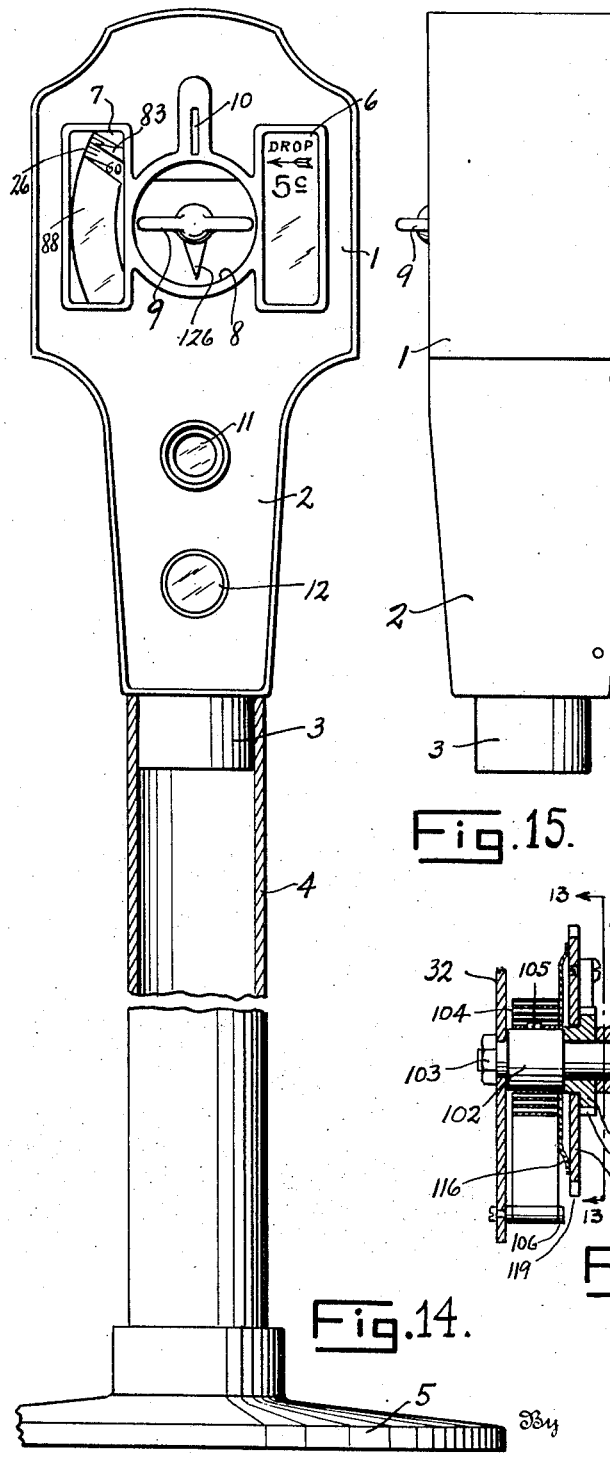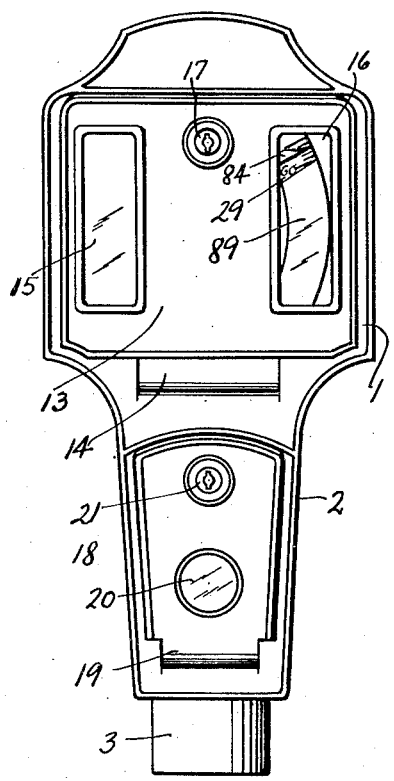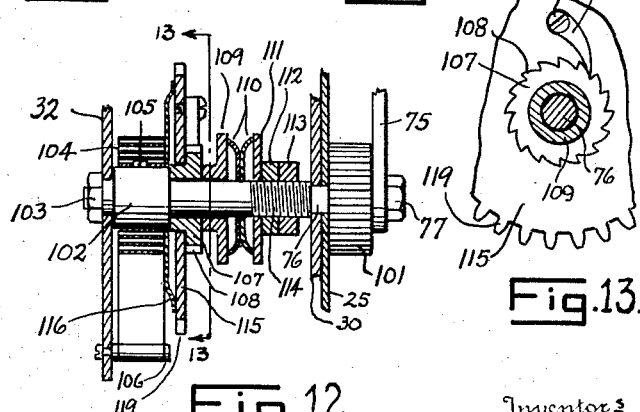

Patented Apr. 23, 1940

2,198,422

UNITED STATES PATENT OFFICE 2,198,422

COIN CONTROLLED TIMING DEVICE

William N. Woodruff, Houston, Tex., and Noel Marshall Seeburg, Chicago, Ill., assignors, by mesne assignments, to Vehicular Parking, Ltd., Washington, D. C., a corporation of Delaware Application March 16, 1936, Serial No. 69,166
Renewed November 4, 1939

9 Claims. (Cl. 161—15)

This application relates to timing devices primarily designed for the purpose of timing the parking of vehicles.

Devices for timing the parking of vehicles have heretofore been designed for operation in various ways. For example, some of the prior art devices are adapted to be operated by pressure applied to a given portion of the device by a vehicle parked in the designated area. Others are adapted to be started and stopped manually by the operator of the vehicle. Still others are adapted to be started manually and stopped automatically after a given length of time has expired. It is an object of this invention to provide a device which is adapted to be started by the operator of the vehicle at the time the same is parked, to provide a clear indication at all times of the amount of time the vehicle has been parked, and to provide a clearly visible signal adapted to be actuated when the vehicle has been parked a predetermined length of time.

It is a further object to provide a coin control for this type of mechanism.

It is a further object to provide a mechanism of this type which is actuated by a spring powered clock mechanism, and to provide for the rewinding of said mechanism upon the manual operation of the coin controlled starting device.

It is a further object to provide a device of this type having a coin controlled means for resetting the indicating mechanism, and for simultaneously rewinding the power producing unit.

It is a further object to provide a device of this character in which the clock mechanism cannot be stopped within a predetermined period without access to the interior of a housing in which it is mounted.

Other objects and advantages of this invention will become apparent from the following description and the accompanying drawings taken with the appended claims. It is to be understood, however, that the particular embodiment set forth in the following description and the accompanying drawings is by way of illustration only, and is not to be construed as a limitation on this invention. This invention is to be limited only by the prior art and by the terms of the appended claims.

Referring more particularly to the drawings in which like numerals indicate corresponding parts throughout:

Fig. 1 is a vertical cross section through the housing for the parking meter taken directly behind the front wall thereof.

Fig. 2 is a similar view with parts broken away taken directly behind the rear wall thereof.

Fig. 3 is a horizontal section illustrating a portion of the indicating means and the relation which the parts thereof bear to each other.

Fig. 12 is a vertical sectional view showing a portion of the clock works mechanism.

Fig. 13 is a detail section of a portion of the clock works mechanism taken along the line 13—13 of Fig. 12.

Fig. 14 is a front view of the outside of the complete device as it appears in use, a small portion of the support being shown in section.

Fig. 15 is a side elevation of the upper portion of the device shown in Fig. 14, looking from the right thereof.

Fig. 16 is a rear elevation of the device shown in Fig. 15.

Figure 4:
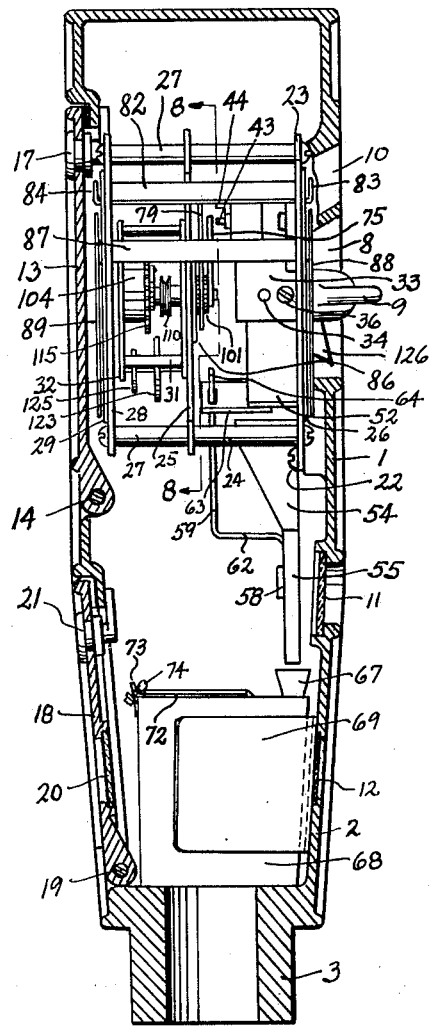
Fig. 4 is a vertical section taken along the center line of the housing and illustrating the mechanism of this invention in side elevation.

Referring more in detail to the structure shown, (see Figures 14, 15 and 16) the mechanism of this invention is mounted within a housing having an upper portion 1 for receiving the mechanism proper, a lower portion 2 within which the coins that have been placed in the device are collected, and a lower end portion 3 of a size to fit within the vertical tubular support 4. This tubular support 4 is in turn mounted on a base 5 or may be secured in vertical position by any other desirable means. It is to be understood that the housing containing the mechanism may be anchored to its support to prevent its removal therefrom by any well known desirable means.

The portion 1 of the housing is provided on its front face with a panel 6 which may be utilized for exhibiting directions for operation of the device, or for any other purpose desired, and a panel 7 in which is secured a pane of glass or similar material forming a window through which the indicating mechanism can be viewed. An opening 8 is provided through which the knob 9 forming the external portion of the manual operating mechanism may project. Directly above the opening 8 is a slot 10 adapted to receive a coin for controlling the action of the knob 9.

Formed in the front wall of the part 2 are two round windows 11 and 12. The window 11 is for the purpose of enabling an observer to see the last coin which has been placed in the device, said coin to be held before this window in a manner which will be presently described. The window 12 is for the purpose of enabling an observer to see at a glance whether or not the coin receiving box or bank is in its proper place within the housing.

The rear wall of the portion 1 (see also Figure 4) is formed with a door 13 hinged adjacent its lower edge at 14, and provided with panels 15 and 16 corresponding respectively to the panels 6 and 7 in the front wall. A suitable lock 17 is provided adjacent the upper edge of the door 13 for the purpose of preventing unauthorized tampering with the mechanism.

Mounted in the rear wall of the portion 2 of the housing is a second door 18 hinged adjacent its lower edge as at 19, and provided with a window at 20, and a lock 21. This door 18 is for the purpose of providing access to the coin receiving box, and the window 20 which is directly opposite the window 12 in the front wall of the housing when the door 18 is closed is for the purpose of enabling an observer to tell definitely at a glance whether or not the coin receiving box is in place.

The mechanism is mounted within the portion 1 of the housing by means such as screws 22 which pass through a front plate 23 forming a portion of the mechanism frame. This front plate 23 is connected by means of posts 24 to a rear plate 25. Mounted on the front of the plate 23 and in alignment with the window 7 of the housing is a dial 26 (see Figures 1 and 2). Two of the posts 24 are provided with rearward extensions 27 on which is mounted a plate 28 carrying a second dial 29 in alignment with the window 16 in the door 13 in the rear of the housing.

Mounted on the rear of the plate 25 is a clock work mechanism mounted in a suitable frame, said frame comprising a front plate 30 which is secured directly to the rear of the plate 25, rearwardly extending posts 31, and a rear plate 32.

Figure 5:
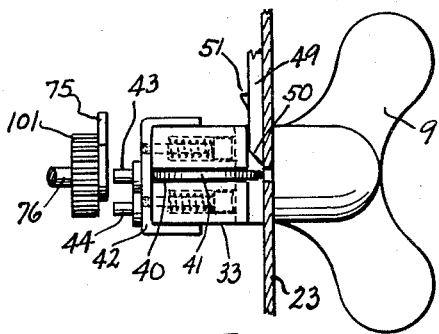
Fig. 5 is a top plan view of the coin controlled manual operating means in its initial position showing a coin which has just been inserted in place therein.

An arm 33 (see Figures 4, 5 and 11) is mounted behind the plate 23 on the axis of the knob 9, and is keyed to this axis by means of a pin 34. This arm 33 is normally held in its vertical position directly behind the coin slot 10 in the housing by means of a spring 35 anchored at one end to the plate 23 by a screw 37, and at the other end to the arm 33 by means such as a screw 36. The rotational movement of this arm 33 about the axis of the knob 9 is limited by means of stops 38 and 39 shown in Fig. 10.

Figure 10:
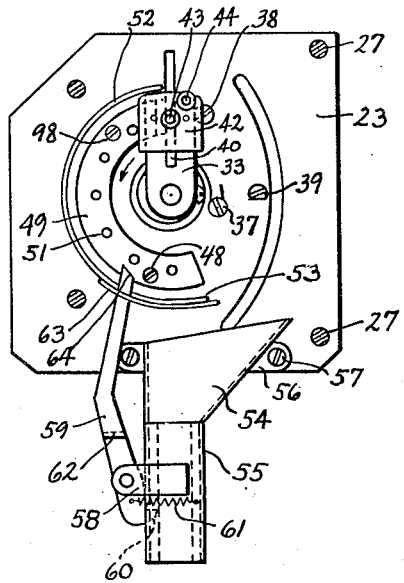
Fig. 10 is a view taken along the line 10—10 of Fig. 11, and showing in elevation those parts of the device with which the coin cooperates.
Figure 11:
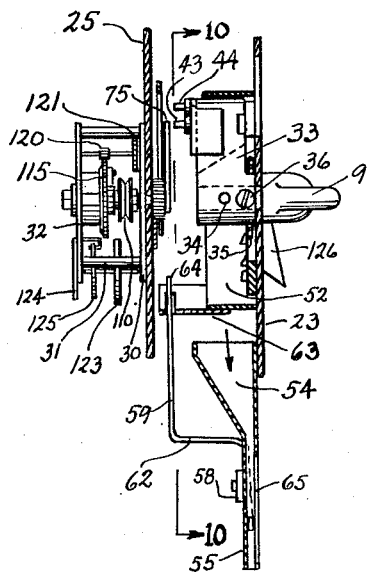
Fig. 11 is a vertical section substantially along the center line of the mechanism, but showing the time controlled or clock works portion of the mechanism in elevation.

The arm 33 is formed with a slot 40 in a longitudinal plane, said slot being so positioned as to be in direct alignment with the slot 10 in the housing when the arm 33 is in its vertical position as illustrated in Figs. 10 and 11. In this position it is apparent that it will receive a coin 41 passed through said slot, and that the rear edge of said coin will rest against an angle shaped member 42 which embraces the rear portion of the arm 33. Projecting rearwardly from this member 42 are a pair of pins 43 and 44, the purpose of which will presently be described. The channel shaped member 42 is held in its proper position by means of screws 45 passing through a portion of the arm 33, and having a portion surrounded by springs 46 disposed within recesses in the opposite face of the arm 33. The screws 45 are provided with heads 47, and it will be seen that the springs 46 will constantly urge the screws 45 in such a direction as to hold the channel shaped member 42 against and in embracing relation with respect to the arm 33.

Figure 6:
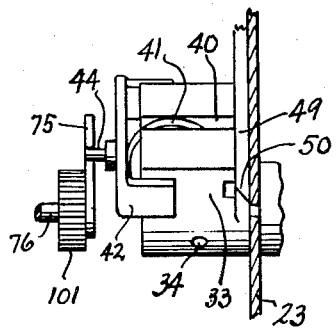
Fig. 6 is a similar view showing this means after the manual operation has begun.
Figure 7:
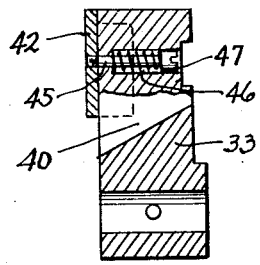
Fig. 7 is a longitudinal cross section through the lever forming a portion of the manual operating means.

Secured to the rear face of the plate 23 by means of screws 48 is a track 49 having a beveled end 50 (see Figures 5 and 6), this track lying in the path of the coin 41 as it is moved around by the turning of the knob 9 and the arm 33. It will be seen that as the coin rides up on the beveled end 50 of the track 49 it will force the channel shaped member 42 outwardly away from the arm 33, and will hold it in that position as the coin rides along the surface of the track 49. Disposed at intervals along this track 49 are small projections 51 forming ratchet teeth over which the coin 41 will ride in the forward direction of movement, but if the knob 9 be released, the coin 41 will be caught by the last of these projections over which it has passed, and the knob 9 will be prevented from returning to its original position. Extending in a circular path substantially parallel to the track 49 (see Figure 10), and radially outwardly therefrom, is a shield or retaining member 52 adapted to prevent the coin 41 from moving radially outwardly out of the slot as the arm 33 is turned, and to release the coin from the slot only after it has been turned past the lower end 53 of the shield 52.

Located directly below the lower end of the shield 52 as illustrated in Figure 10, is a hopper 54 leading into a coin chute 55. This hopper is provided with ears 56 by which it is secured to the plate 23 with screws 57 or the like. The hopper is adapted to receive the coin as it drops from the slot in the arm 33, and to guide the coin into the coin chute 55.

Mounted on the coin chute 55 is a lug 58 pivotally mounting a lever 59 which carries on its lower end a coin catch 60 by which the coin is temporarily arrested in its movement downwardly through the chute 55. The point at which the coin is arrested is such that it will be directly in alignment with the window 11 in the front wall of the housing (see Figures 1, 2 and 4), and since the coin chute is also on that side as illustrated, it may be viewed from outside the housing. By this manner, counterfeits and slugs may be easily detected.

The lever 59 (see Figures 1, 10, and 11) is normally urged into such position that the coin catch will arrest the movement of a coin by means of a spring 61. An off-set portion 62 is provided above the pivotal support for this lever, and the upper end of the lever passes through a slot formed in a guide member 63. This upper end is beveled at 64. When a coin is in position in the arm 33, and this arm is rotated as just described, the pin 44 on the channel shaped member 42 is adapted to engage the upper end of the lever 59 and move the coin catch out of position to release the coin that may be at the time held thereby. When the pin 44 passes the lever 59, the lever will resume its original position as shown in Fig. 10 so as to arrest the coin dropping from the arm 33. The arm 33 upon its return movement will not contact the lever 59 because of the fact that the pin 44 and the channel shaped member 42 will not be projected sufficiently without any coin in place in the arm 33 (see Figure 11).

When the catch 60 is released, the coin is moved downwardly from before the window 11 and the opening 65 in the coin chute and drops (see Figures 1 and 4) into the hopper 67 on top of the coin box 68. This coin box is resiliently held in its position by a leaf spring gripping device 69 in such a position that it is readily visible through the opening 12 in the front wall of the housing, and the opening 20 in the door 18, both of which openings have been previously described. The top of the box 68 is provided with an opening adapted to be closed by a sliding member 72 having an upturned end 73. The box 68 is provided with a downwardly turned lip adjacent the upturned end of the slide, in such position that when the slide is closed a seal 74 may be placed around its up-turned end and the downwardly turned ear on the box to seal the box shut.

When the arm 33 is rotated as previously described with the coin in position in its slot, the pin 43 (see Figures 4, 5, 6, and 11) will be moved to such a position that it will engage the lever 75 mounted on a shaft 76, and secured in place by a nut 77. The shaft 76 is co-axial with the knob 9, and through the medium of the lever 75 is rotated when the arm 33 is rotated with a coin in position. Mounted on the shaft 76 is a pinion adapted to engage a rack gear segment 78 (see Figures 8 and 9) carried by a pointer arm 79 (see also Figure 3). This pointer arm 79 is pivoted on a screw 80 and has an angled end 81 to which a cross member 82 is secured. This cross member 82 is bent at its ends and is formed with pointers 83 and 84 which are respectively adapted to movement over the dials 26 and 29 previously described. It will be here noted that these dials are graduated preferably in minutes of time (see Figures 1, 2, 14, and 16) and that the pointers are adapted to move over them as time progresses while the meter is in use.

A second arm 85 (see Figures 3, 8, and 9) is pivoted on the same screw 80 and provided with an off-set portion 86 enabling it to follow the movement of the pointer arm 79 without interfering with the pinion on the shaft 76. This arm 85 is provided with a bent end to which is secured a cross member 87 carrying shields or flags 88 and 89. The arm 85 extends in the opposite direction from the pivot 80 as shown at 90, and is provided with a notch 91 at its extremity adapted to co-act with the end 92 of the pawl 93. When the pawl 93 is in engagement with this notch 91, the shields 88 and 89 will be held in their lower position as illustrated in Fig. 9. The pawl 93 is pivoted at 94, and is provided with a spring 95 anchored on the plate 25 at 96 for the purpose of constantly urging the pawl into engagement with the notch 91. The arm 85 is provided with a pin 97 on the extension 90 (see also Figure 2), this pin extending through a slot 98 in the plate 25, and being connected on the opposite side of said plate with a spring 99. This spring constantly urges the shield arm 85 in such a direction as to move the shields upwardly over the dials 26 and 29.

Figure 8:
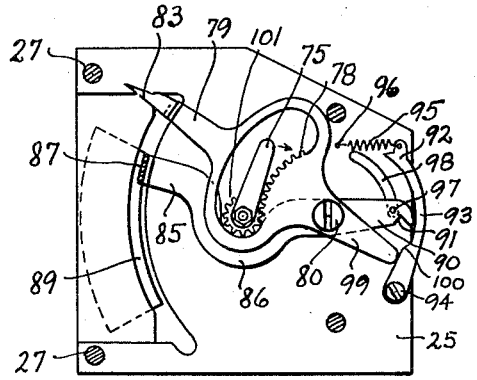
Fig. 8 is a sectional view taken along the line 8—8 of Fig. 4, and illustrating certain details of the indicating mechanism.
Figure 9:
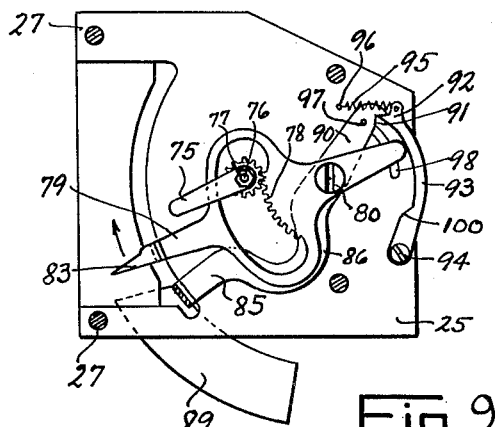
Fig. 9 is a similar view showing the parts of the indicating mechanism in a different position.

The pointer arm 79 is likewise provided with an extension on the opposite side of the pivot 80, and this extension is such as to move along the inner side of the pawl 93 (see Figure 9) without actuating this pawl until it contacts with an angled portion 100, as shown in Figure 8, formed on the inner side of the pawl. When this point is reached, further movement of the pointer arm 79 causes the pawl 93 to be moved out of engagement with the notch 91, and releases the shield arm so that the shields 88 and 89 may be moved upwardly by the spring 99 until they cover a substantial portion of the dials 26 and 29.

The pinion on the shaft 76, which pinion bears the numeral 101 (see Figures 11 and 12), is located on one side of the plate 25. This shaft passes through the plates 25 and 30, and is provided on its opposite end with an enlarged portion 102, and a reduced portion passing through the plate 32. It is held in position within the plate 32 by means such as a nut 103. Surrounding the enlarged portion 102 is a main spring 104 secured at its inner end to the enlarged portion by means of a lug 105 formed thereon, and anchored at its outer end on a pin 106 mounted on the plate 32. On the opposite side of the enlarged portion from the plate 32 (see also Figure 13) there is freely mounted a ratchet wheel 107 having ratchet teeth 108. Frictionally pressed against this ratchet wheel 107 is a friction disc 109. Against the opposite face of the disc 109 is one of a pair of friction springs 110 which engage each other. The other of these springs 110 bears against the friction disc 111, and the friction disc 111 is held in position by means of an adjusting nut 112 and a lock nut 113 threaded on the portion 114 of the shaft 76.

Rotatable with respect to the ratchet wheel 107 (see Figures 11 and 12) is a gear 115 which is normally pressed against this ratchet wheel by means of a spring 116 bearing against the edge of the main spring 104. This gear 115 carries a pawl 117 pivotally secured thereto at 118, and adapted to engage the teeth 108 of the ratchet wheel 107 so as to permit relative rotation of the ratchet wheel and gear in one direction only. The gear 115 has teeth 119 meshing with a pinion 120 which forms a part of a clock work gear train. This gear train includes a gear 121 (see Figure 2) mounted on the same shaft with the pinion 120, and among others the gear 122 which serves to drive an escapement including the balance wheel 123. A customary lever 124 is employed for regulating the rate of escapement through the medium of the hair spring 125.

The operation of the meter just described is as follows:

A coin is inserted through the slot 10 and enters the slot 40 in the arm 33. The knob 9 is then turned and as it turns the coin 41 contacting with the beveled end 50 of the track 49 rides up thereon and causes the pin 43 to contact the lever 75. As the knob is continued to be turned, the lever 75 is turned together with the shaft 76, and the pinion 101. This causes the winding of the main spring 104, the ratchet wheel 107 at this time turning within the gear 115 in the direction permitted by the pawl 117. If the knob be released prior to the completion of its turning movement, the arm 33 will be held against backward movement by means of the engagement between the coin 41 and the teeth or projections 51. As the knob 9 is rotated further, the rotation of the pinion 101 serves to move the pointer arm 79 toward the position where the pointers 83 and 84 will indicate the zero point of the dials 26 and 29. As the pointers move downwardly they carry with them the shields 88 and 89, and when the lowermost point is reached, the shield arm is retained in this position by co-action of the pawl 93 with the notched end 91 of the shield arm. When the knob has been turned sufficiently for the coin to reach the lower end of the shield 52, the coin will drop from the arm 33 into the hopper 54, and slide down the coin chute 55 until it is stopped by the catch 60. It will be retained in this position so that it may be inspected from without through the window 11 until the knob 9 is again operated with a coin in position in the arm 33. The first coin will then be released by contact of the pin 44 with the lever 59, and will move downwardly again and drop into the coin box 68. When the knob 9 is released, after having been moved to its downward position, it will be returned by the spring 35 to its original position.

It will be seen that the movement of the knob 9 with a coin in position serves to rewind the main spring, to reset the pointer and the shields, and to start the clock mechanism measuring time. Rotation of the knob 9 without a coin in position, however, will cause none of these things, because the pins 43 and 44 will not project sufficiently to contact with their respective levers 75 and 59. When the mechanism has been reset, the clock work will cause the pointers to move upwardly along the dials 26 and 29 until the position has been reached at which the pointers will indicate that the parking time paid for has expired. At this point, the extension of the pointer arm will contact with the pawl 93 and release the shield arm, thus permitting the shields to move upwardly over the dials and indicate that the parking time has expired, and if a vehicle remains parked thereafter it is illegally parked. This is shown by the signal shields, the particular length of time of overtime of parking being indicated by the further movement of the pointers along the exposed portions of dials 26 and 29. When the pointers reach the upper limit of their travel, the clock mechanism will automatically stop, and the meter will remain inactive until another coin is inserted and the knob 9 turned to reset the mechanism.

In order to prevent the insertion of a second coin and the turning of the knob part way to a position where it will be retained by the projections 51, and cause the stoppage of the clock mechanism without the shields moving over the dial, the knob 9 may be formed with an arrow-shaped projection 126 so that an officer may readily observe if the knob is left out of its proper position. Both the arrow 126 and the shields 88 and 89 are preferably painted a distinctive color, usually red, so that a casual observer will have his attention attracted thereto.

It will be appreciated that by the structure above described there is provided a device capable of carrying out all the objects of this invention in a thoroughly practical and desirable manner. It will be appreciated, however, that various changes may be made in the parts and combinations thereof without departing from the spirit and scope of this invention as defined by the appended claims.

Having described our invention, we claim:

1. In a device of the character described, a scale graduated in divisions of time, a shield movable to cover a portion of said scale to give an alarm, means for setting said shield to a position uncovering said scale, timing means, means movable over said scale and controlled by said timing means for indicating lapse of time following such setting, and means also controlled by said timing means for causing movement of said shield to cover a portion of said scale after the lapse of a predetermined period of time from the time it was set.

2. In a device of the character described, a scale graduated in divisions of time, a shield movable to cover a portion of said scale to give an alarm, indicating means movable over said scale to indicate passage of time, means for causing movement of said shield to cover a portion of said scale, means for setting said shield to a position uncovering said scale and for setting said indicating means to the zero point on said scale, and timing means for moving said indicating means over said scale to indicate passage of time following such setting, and for releasing said shield after the lapse of a predetermined period of time from the time it was set to permit it to cover a portion of said scale.

3. In a device of the character described, a scale graduated in divisions of time, a shield movable to cover only a portion of said scale to give an alarm, indicating means movable over said scale to indicate passage of time, means for causing movement of said shield to cover only a portion of said scale, means for setting said shield to a position uncovering said scale and for setting said indicating means to the zero point on said scale, and timing means for moving said indicating means over said scale to indicate passage of time following such setting, and for releasing said shield after the lapse of a predetermined period of time from the time it was set to permit it to cover only a portion of said scale to signal overtime operation, the amount of which is indicated on the uncovered portion of said scale.

4. In a device of the character described, means for indicating the lapse of time, means provided to cover said indicating means, means for setting said time-indicating means and covering means with respect to one another to uncover said indicating means, timing means, and means controlled by said timing means for causing said indicating means to be covered by said covering means after the lapse of a predetermined period of time from the time said indicating means was uncovered.

5. In a parking meter, in combination, means including a scale and pointer for indicating lapsed time, alarm signal means, means for setting said first means to a predetermined initial indicating position and rendering said signal means substantially invisible, token controlled means actuating said setting means, means rendering visible said signal means upon said first means measuring a predetermined period of time following said setting, means associated with said pointer for denoting the lapse of an additional period of time, and means stopping operation of said meter after the lapse of such further period.

6. In a parking meter, in combination, timing means including time-indicating means, visual means for signalling proper operation of said time-indicating means, second visual means for signalling improper operation or lack of operation of said time-indicating means, means for rendering visible said first visual means and substantially obscuring said second visual means upon setting said time-indicating means to a predetermined initial indicating position and initiating operation of the same, means for rendering visible said second visual means and substantially obscuring said first visual means upon expiration of a predetermined period of time following said initiation of operation of said time-indicating means and obscuring said second visual means, said timing means including means for indicating the passage of an additional period of time immediately succeeding the expiration of said predetermined period of time, and means stopping the operation of the timing means after the passage of such additional period.

7. In a parking meter, in combination, timing means including means for indicating the passage of time having an indicating hand and visual means for signalling proper operation of the same, means for rendering visible said visual means upon initiating operation of said time-indicating means and for rendering invisible said visual means upon expiration of a predetermined period following such initiation of operation and rendering visible of said means, said timing means also including additional visual means for indicating overtime operation of the meter, and means for stopping the timing means after the expiration of overtime period.

8. In a parking meter, in combination, a graduated scale; an indicator movable over the surface of said scale; timing means including clock work for controlling such movement; alarm signalling means; means for setting said indicator to an initial indicating position, winding the clock work of said timing means and rendering said alarm signalling means substantially invisible; means actuated after the lapse of a predetermined period of time following the moving of said indicator to said initial indicating position to render visible said alarm signalling means to show expiration of such period; an additional graduated scale associated with said indicator for registering overtime operation of the meter; and means for stopping said timing means upon expiration of the overtime period.

9. In a parking meter, in combination; timing means including a scale and pointer for indicating lapsed time and an additional scale associated with the pointer for indicating the lapse of an additional period of time; means for showing expiration of an allotted parking period; means for setting said scale and pointer to a predetermined initial indicating position and rendering said expiration-showing means inoperative; means actuating said expiration-showing means to show expiration of a parking period upon said first means reaching a predetermined point following said setting; and means stopping operation of said timing means after the lapse of the additional period of time.

WILLIAM N. WOODRUFF.
N. MARSHALL SEEBURG.